United States Patent
Kroboth et al.

(10) Patent No.: US 6,826,507 B2
(45) Date of Patent: Nov. 30, 2004

(54) METHOD AND APPARATUS FOR DRILLING TO MEASUREMENT DATA FROM COMMONLY DISPLAYED HETEROGENEOUS MEASUREMENT SOURCES

(75) Inventors: Robert H. Kroboth, Colorado Springs, CO (US); David L. Rarnard, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/225,181

(22) Filed: Aug. 22, 2002

(65) Prior Publication Data

US 2004/0039542 A1 Feb. 26, 2004

(51) Int. Cl.[7] .............................................. G06M 11/04
(52) U.S. Cl. ........................................ 702/127; 700/95
(58) Field of Search ........................... 702/127; 707/10, 707/102, 502; 709/224, 246; 705/10

(56) References Cited

U.S. PATENT DOCUMENTS

| | | | | |
|---|---|---|---|---|
| 5,724,575 | A | * | 3/1998 | Hoover et al. ................ 707/10 |
| 6,507,765 | B1 | * | 1/2003 | Hopkins et al. .............. 700/95 |
| 2003/0050825 | A1 | * | 3/2003 | Gallivan et al. ............. 705/10 |
| 2003/0130823 | A1 | * | 7/2003 | Potyrailo et al. .......... 702/189 |

* cited by examiner

*Primary Examiner*—Bryan Bui
*Assistant Examiner*—Xiuqin Sun

(57) ABSTRACT

A network monitoring and/or troubleshooting system to collect heterogeneous scalar measurement data over a network from a plurality of devices connected to the network and normalize the collected heterogeneous scalar measurement data based on a mathematical transform of collected scalar measurement data into a common mathematical space. When the transformed scalar measurement data is displayed in graphical representations, underlying data of the graphical representation can be drilled into, with context, to display additional heterogeneous scalar measurement data, scalar measurement data from data collectors, and measurement data stored in network devices generating the heterogeneous scalar measurement data.

25 Claims, 6 Drawing Sheets

METHOD AND APPARATUS FOR DRILLING TO MEASUREMENT DATA FROM COMMONLY DISPLAYED HETEROGENEOUS MEASUREMENT SOURCES

BACKGROUND OF THE INVENTION

With the growing reliance on networks, and accordingly network stability, network administrators need to be able to monitor and troubleshoot networks, which can be accomplished through use of monitoring devices on the networks. Examples of devices from which measurements may need to be taken include, for example, routers, switches, servers, clients, PCs, telecommunications equipment, voice gateways, etc. An example of a monitoring and/or troubleshooting of a network may include a network administrator viewing usage of a network on a display or having the capability to access additional measurement data of that network usage by drilling down to more detailed measurement data. Typically, the displaying of measurement data will include graphs or plots illustrating graphically the measurement data versus a predetermined unit, e.g., an average usage of a network per hour. Drilling down to more detailed measurement data may include the capability to access measurement data used in formulating such graphically illustrated measurement data, i.e., the ability to view or print out the raw data used in generating the graphic or reformulating the graphic based on more fine criteria.

Typically, the monitoring of such network devices is accomplished seamlessly since all the network devices may be controlled by one protocol, for example, SNMP. However, multiple other protocols exist, such as XML and CMIP, that are also used by the network devices when transferring measurement data or by a control unit collecting measurement data from multiple network devices. Similarly, measurement data, which is collected by a network device, transferred from the network device, and collected by a control unit, will have a particular format, e.g., floating point, integer, negative value capability, positive value capability, binary, hexadecimal, logarithmic, etc.

Scalar measurement data from a plurality of network devices that are not all monitored using the same protocol is typically defined as being heterogeneous as to its source, compared to scalar measurement data from a plurality of network devices, which are monitored using the same protocol, being defined as homogeneous. In networks containing network devices that are controlled by heterogeneous protocols, network administrators are required to individually monitor or display the network devices controlled by that protocol, separate from other network devices controlled by another protocol, or to monitor or display in a single graphic illustration measurement data from multiple network devices when all the network devices are not controlled by the same protocol. In some instances, network administrators create individualized simplified homogeneous solutions. For example, in a network containing CMIP and SNMP protocols, a CMIP management system can be set up with a gateway to receive SNMP data. The gateway then emulates the SNMP data to correspond to CMIP data based on a simplification of the differences between SNMP and CMIP data, so the measurement data can all be collected and displayed based on the CMIP protocol. However, such solutions must be individually designed, tested, and implemented. Further, individual design, testing, and implementation occupies valuable time and resources. A need exists for a universal data model that is able to commonly display the heterogeneous scalar measurement data.

SUMMARY OF THE INVENTION

The present invention provides a universal data model that is able to set a common threshold for heterogeneous scalar measurement data such that a contextual drilling into the heterogeneous scalar measurement data is operative from a display of the heterogeneous scalar measurement data.

The present invention provides a system for drilling into displayed heterogeneous measurement data by transforming collected heterogeneous scalar measurement data from heterogeneous network devices by using a mathematical transform to transform a heterogeneous scalar measurement data, from one of the network devices, into a homogeneous mathematical transform space so that the heterogeneous scalar measurement data is normalized, displaying the transformed heterogeneous scalar measurement data, and drilling into the displayed transformed heterogeneous scalar measurement data to display additional measurement data from which the displayed transformed heterogeneous scalar measurement data is based.

The present invention provides a system that drills into displayed heterogeneous scalar measurement data, including a transforming unit to transform collected heterogeneous scalar measurement data from heterogeneous network devices by using a mathematical transform to transform a heterogeneous scalar measurement data, from one of the network devices, into a homogeneous mathematical transform space so that the heterogeneous scalar measurement data is normalized, a displaying unit to display the transformed heterogeneous scalar measurement data, and a drilling unit to drill into the displayed transformed heterogeneous scalar measurement data for display, by the display unit, of additional measurement data from which the displayed transformed heterogeneous scalar measurement data is based.

These together with other advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
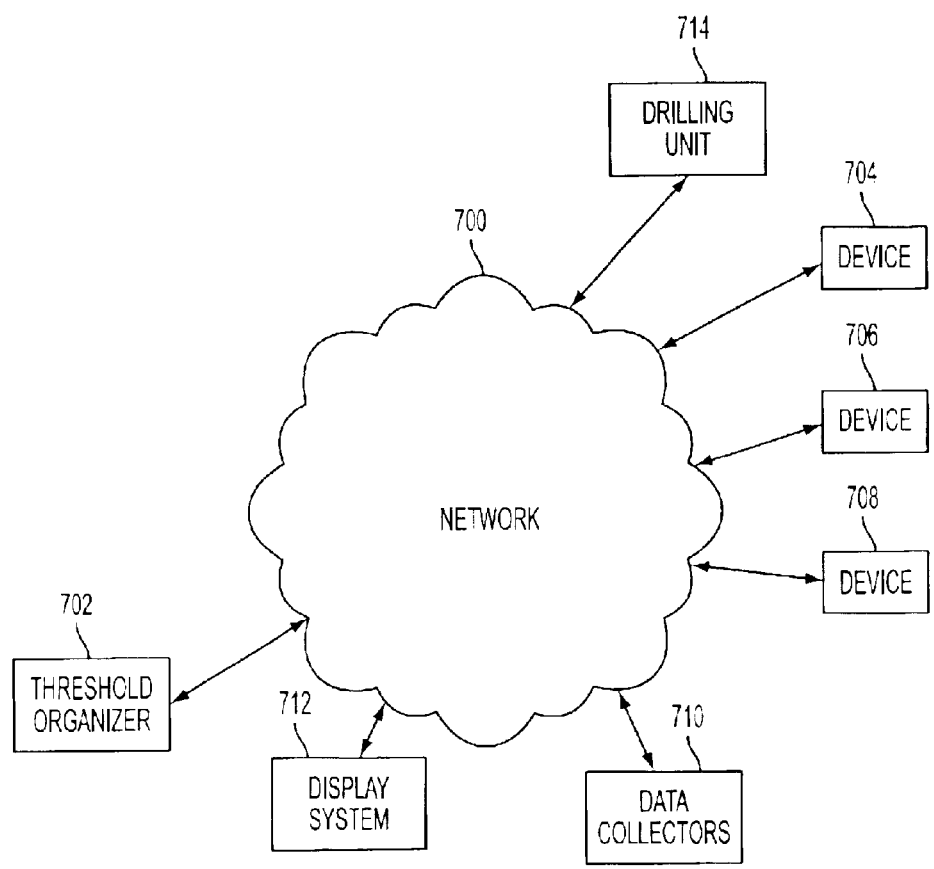
FIG. 1 is a diagram illustrating a network connected to a plurality of devices, a data collector, a display system, a threshold organizer, and a drilling unit, according to embodiments of the present invention.

Reference will now be made in detail to the present preferred embodiments of the present invention, examples of which are illustrated in the accompanying drawings, wherein like reference numerals refer to like elements throughout.

Network devices may be controlled via different protocols, e.g., SNMP, XML, CMIP, http, Corba, IEEE-488, IDL, TL1, SCPI, ASCII, etc. The term "heterogeneous" is defined as "different in kind; unlike; incongruous." Random House Webster's Unabridged Dictionary 897 ($2^{nd}$ ed. 1998). Scalar measurement data taken from a plurality of network devices controlled via different protocols is heterogeneous, for example, as to its source as well as, for example, type of value (e.g., floating point, integer, signed, unsigned, etc.), scale (e.g., truncated, positive, negative, variable, etc.), and/or time scale (e.g., intervalized, asynchronous, etc.). The present invention allows for common heterogeneous scalar measurement data to be displayed.

For example, if a network contains a PC and several heterogeneous network devices, e.g., one being a router, and the router contains a counter that is available by SNMP to count how many packets go through the router, a network administrator may want to monitor the rate of packet flow through the router. If too many packets per second are flowing through the router, the network may become congested. The network administrator would need to gather the SNMP data, process the data, and determine whether a threshold has been, will be, or is currently exceeded (i.e., too many packets per second). Further, based on a sampling over a period of time, for example, an overall congestion of the network can be illustrated in a graphical format for quick and easy digesting of such information.

FIG. 1 is a diagram illustrating a network connected to a plurality of devices, a data collector, a display system, a threshold organizer, and a drilling unit, according to embodiments of the present invention. Referring now to FIG. 1, network 700 may be any type of network, e.g., a LAN, WAN, switched, unswitched, ATM, ISDN, wireless, the Internet, etc. However, embodiments of the present invention are not limited thereto. For example, network 700 could be a switching mesh that directly connects connected devices. Devices 704, 706, and 708 are connected to network 700 and may be any type of network devices, e.g., a network element, a router, a switch, a PC, etc. For purposes of illustration, only three network devices are shown; however, embodiments of the present invention are not so limited. For example, there may be greater or fewer than three network devices connected to network 700. Devices 704, 706, and 708 are controlled via a plurality of protocols, e.g., SNMP, XML, CMIP, etc. Typically the network devices can also each act as agents, e.g., an SNMP agent. An agent may have the capability to handle a remote conversation (input/output) and include a functionality of allowing the launching of a user interface for that agent, e.g., that network device.

Data collectors 710 (illustrated as one unit, but not limited thereto) are connected to network 700, and they, as a whole, collect heterogeneous scalar measurement data from devices 704, 706, and 708. Data collectors 710 each interact with one or more network devices, using whatever transmission methodology used by that network device, e.g., frames, packets, cells, etc., to collect scalar measurement data from each network device, and output the scalar measurement device in a transmission methodology compatible with network 700 and/or threshold organizer 702. It is noted, though, that embodiments of the present invention are not limited to a particular number of data collectors. Threshold organizer 702 is also connected to network 700, receives the collected data from the collectors, if a collector is necessary to receive the network device scalar measurement, and normalizes the collected heterogeneous scalar measurement data based on a threshold or thresholds for each particular type of scalar measurement data, e.g., a throughput of data in frames/sec or a latency in milliseconds. Display system 712 is also connected to network 700, and may be a publish/subscribe system that displays the collected and normalized measurement data. Display system 712 can include merely a monitor connected to a processor controlling the format and display of data, or may involve a publication of the data or display of data to a remote location or device, e.g., through a network or the Internet. Drilling unit 714 encompasses hardware and/or software conventionally enabling a drill down to network 700, network devices 704, 706, and 708, data collector 710, threshold organizer 702, and display system 712, for example.

Figure 2:
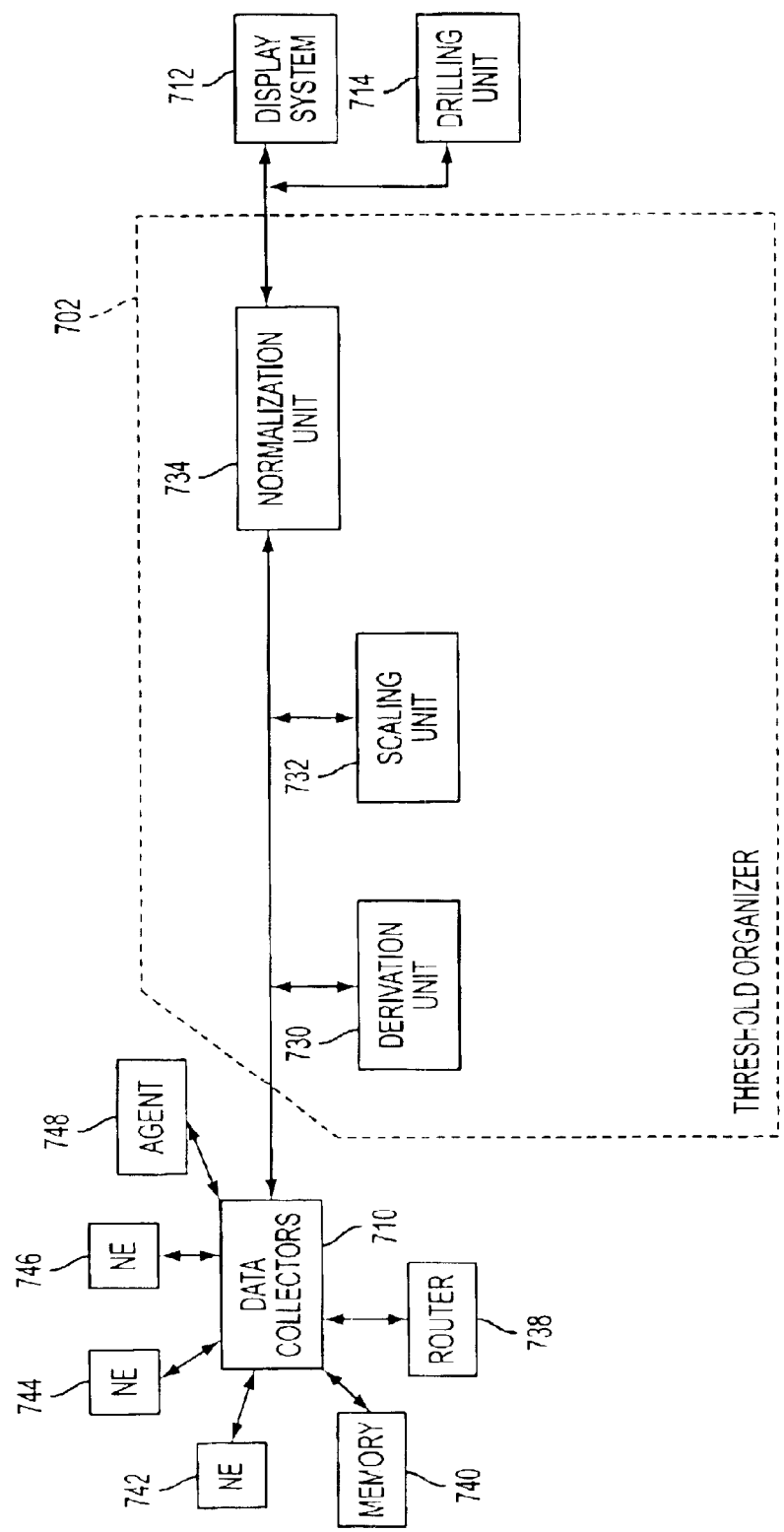
FIG. 2 is a diagram illustrating a more detailed view of the threshold organizer, the data collector, the display system, and the drilling unut, according to embodiments of the present invention.

FIG. 2 is a diagram illustrating a more detailed view of the threshold organizer, the data collectors, the display system, and the drilling unit. Referring now to FIG. 2, threshold organizer 702 is connected to data collectors 710 and display system 712 via network 700 (not shown). Data collectors 710 are connected to router 738, memory 740, network element (NE) 742, network element (NE) 744, network element (NE) 746, and agent 748 via network 700 (not shown); however, embodiments of the present invention are not limited to the devices shown. For example, data collectors 710 may be connected to any type of network device. Heterogeneous scalar measurement data may be collected by data collectors 710 and intervalized if necessary. This intervalization may include, for example, the collected heterogeneous scalar measurement data being collected on cardinal time points, whereby the values would have to be subtracted from the previous value in order to get the measurement for that data interval. However, embodiments of the present invention are not limited to a specific intervalizing technique, as other intervalizing techniques can be used.

Threshold organizer 702 includes, for example, derivation unit 730, scaling unit 732, and normalization unit 734. The collected heterogeneous scalar measurement data is derived by derivation unit 730 if data must be expressed in a different format. For example, if the collected heterogeneous scalar measurement data indicates bytes per second through router 738, that data may be derived by dividing by the speed of the router and applying appropriate factors for bits and byte diversion to get a percentage of utilization of the router. However, embodiments of the present invention are not limited to the previous example, as other derivations may occur. The collected heterogeneous scalar measurement data or the derived measurement may then be scaled by scaling unit 732 if the data needs to be converted into different units.

A network administrator may determine a threshold for each type of incoming scalar measurement data for purposes of generating an event when the threshold is crossed. For example, in regards to utilization, where zero percent utilization is the best and one hundred percent utilization is the worst, the network administrator may set a threshold at thirty-three percent utilization. Embodiments of the present invention are not limited to the setting of one threshold, as a greater number of thresholds may be set. For example, the network administrator may set another threshold at sixty-six percent utilization. Normalization unit 734 automatically normalizes the collected heterogeneous scalar measurement data, the scaled derived measurement, the scaled collected heterogeneous scalar measurement data, or the derived measurement based on these thresholds. In the embodiment with two thresholds discussed above, data might be normalized, for example, to be zero at zero percent utilization, 1 at thirty-three percent utilization, 2 at sixty-six percent utilization, and 3 at one hundred percent utilization. Data falling between the thresholds would be normalized accordingly, e.g., 1.5 at fifty percent utilization.

In an embodiment, the data is normalized by running the data through a transfer function, to transform the data into a common homogeneous mathematical space, where the following expression applies for the positive case (lower x is better):

$y=f(x)$ where $y=3.0$ where $x>=C\text{max}$ $y=2.0+(x-Tyr)/(C\text{max}-Tyr)$ where $C\text{max} >x>=Tyr$ $y=1.0+(x-Tgy)/(Tyr-Tgy)$ where $Tyr>x>=Tgy$ $y=x/(Tgy-C\text{min})$ where $Tgy>x>=C\text{min}$ $y=0.0$ where $x<C\text{min}$ In this RYG transform, x is the input to the transform function, y is the output thereof, Cmin is a minimum constraint value, Cmax is a maximum constraint value, Tyr is the second threshold expressed in the same units as the x value, and Tgy is the first threshold expressed in the same units as the x value. The expression may be modified for the negative case, where higher x is better, or composite cases where there are multiple positive and negative ranges within the input function. Embodiments of the present invention are not limited to this RYG transform, as other functions for normalizing the data may be used, depending on the type of protocols that are expected to be encountered.

Figure 3A:
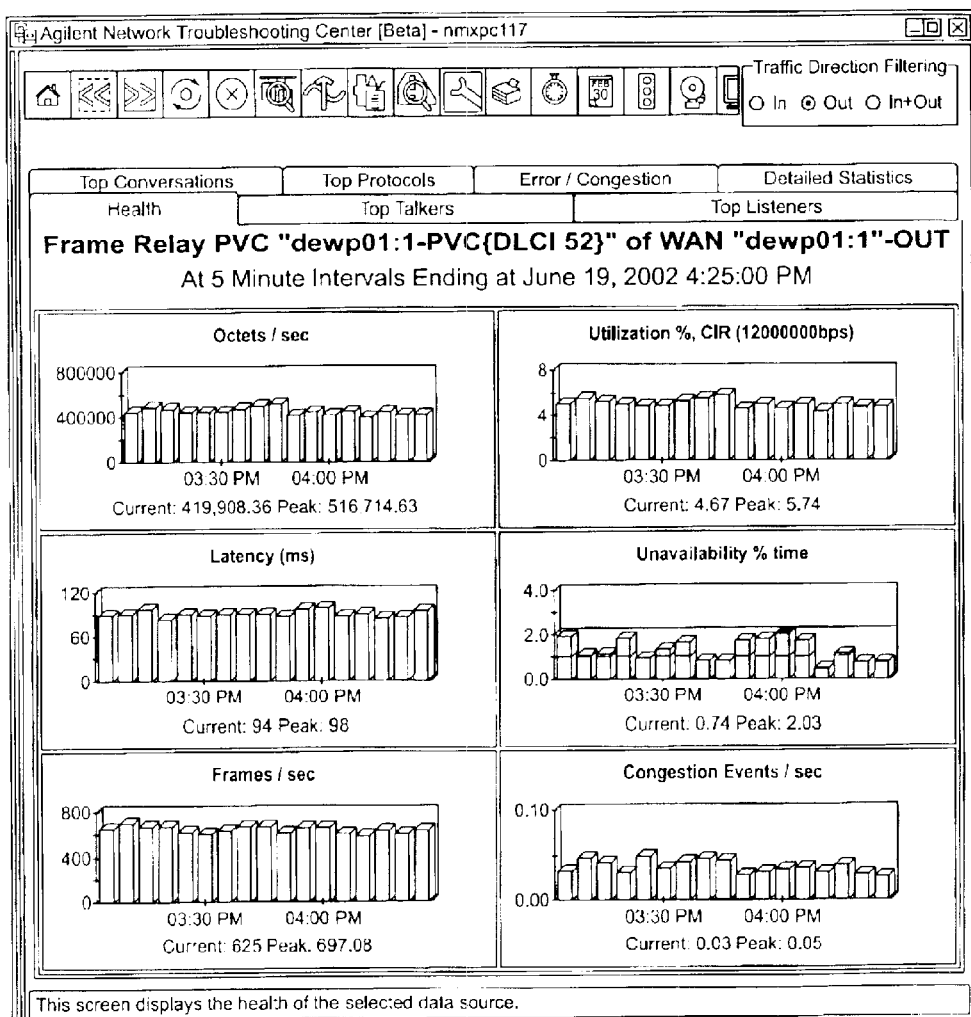
FIGS. 3A–3C are screen shot examples of displayed normalized measurement data for multiple different measurement data types in graphical representations.
Figure 3B:
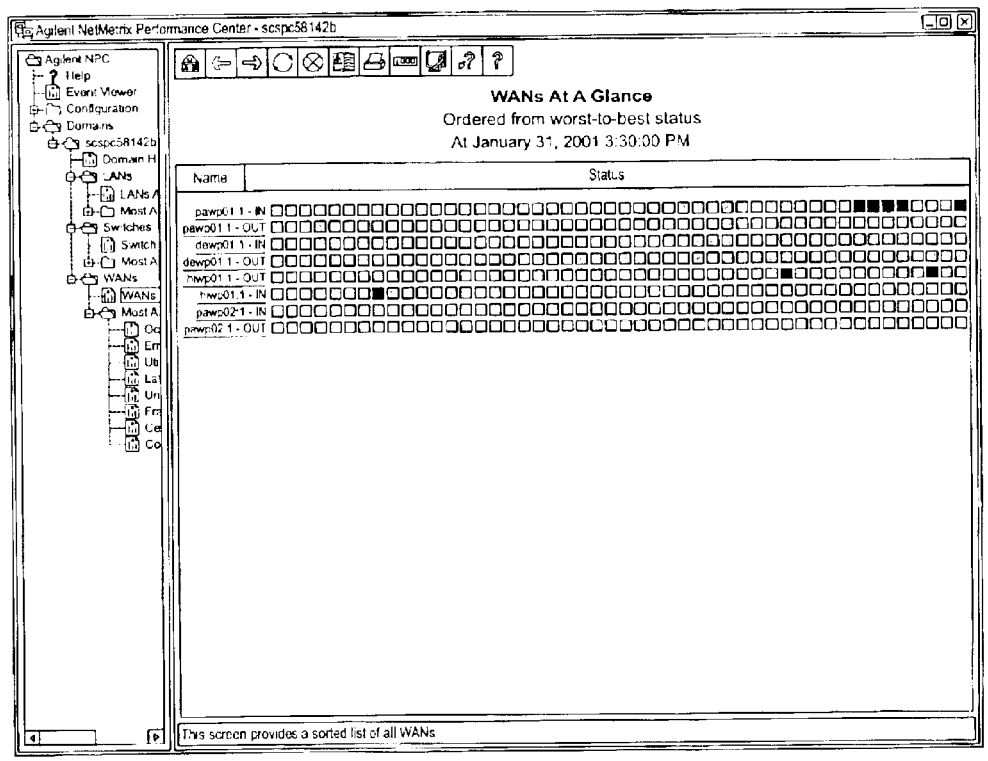
Figure 3C:
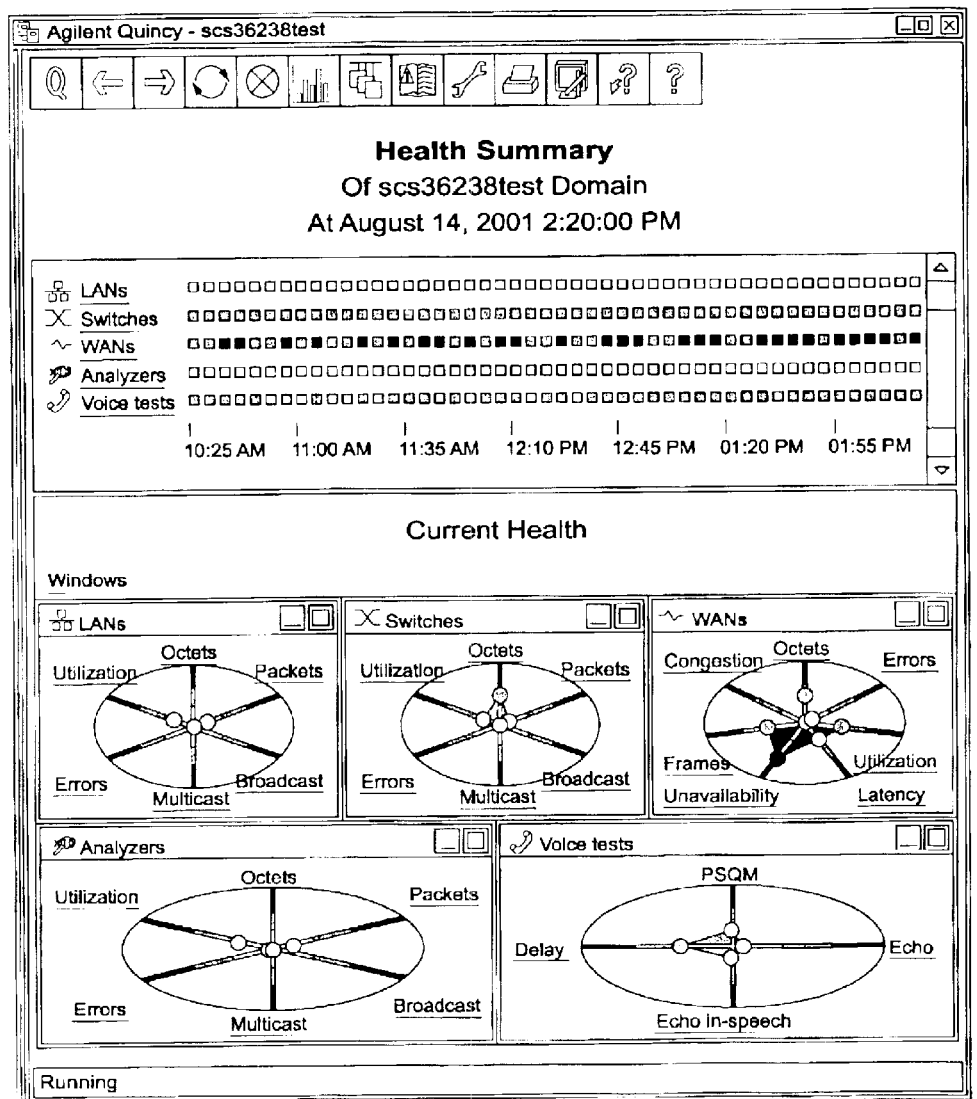

Display system 712 proceeds to receive the normalized measurement data from normalization unit 734, formats the data for display, and displays the data on a monitor, for example. The formatting for display may include an aggregation of heterogeneous measurement data from multiple heterogeneous network devices, so that only necessary or desired heterogeneous measurement data, with any specific organizing or weighting, is displayed in a graphical illustration. FIGS. 3A–3C illustrate screen shot examples of what a typical display may include. Display system 712 could, for example, take all the normalized measurement data and generate a graph of congestion events per second, which upon aggregation of all the corresponding normalized measurement data could be illustrated as shown in the bottom right corner of the FIG. 3A screen shot. In addition to the graphical representations illustrating particular measurements for particular network devices, a single graphical representation could represent an aggregation of data for an entire network, including normalized measurement data from multiple network devices. For example, FIG. 3B sets forth an illustration of WANs ordered from worst to best status, with the dark gray corresponding to a poor or warning status, white corresponding to a less sever status or alert, and with the light gray corresponding to a satisfactory or good status. FIG. 3B includes the name of a WAN or group of WANs, along one axis, according to the passage of time, along the other axis. FIG. 3C illustrates additional examples of potential aggregative illustrations, including an illustration of the health of LANs, switches, WANs, analyzers, and voice tests, all in one graphical representation. Further, FIG. 3C also illustrates radar charts for each of these device, or group of devices, with each radar chart including additional measurement information for each device, or group of devices, illustrating the level of health of the device measurement, e.g., as the circular identifiers in the radar charts move along spokes of the wheel like chart from a central point toward an outer circumference, the health of the device, or group of devices, will be represented as reducing. The color of the circular identifier may also change from a green good status, to a yellow caution status, to a red warning status as the circular identifier moves toward the circumference of the wheel like radar chart.

Typically, display system 712 will include a user interface that will allow a network administrator, for example, to predetermine which measurement data he/she would require to be displayed. Alternatively, the displays or outputs could be automated at particular work stations along the network, outputting particular preprogrammed measurement displays or outputs, or a user could dynamically change the display to display a different graphical representation of different measurement data. As indicated above, display system 712 can include a mere monitor attached to a processor with the capability to format the graphical representations based on the normalized measurement data, a simple display anywhere along the network illustrating or outputting the normalized data based on formatting prepared in a remote processor, or the graphical representations could be accessed through a subscriber service through the Internet or dialup services. In a subscriber service a customer could access a monitoring of a network provided by a provider, or a portion of an overall network, which they may be leasing from the provider, for example. It is also noted that display system 712 may also include printers and the like to output hard copies, either off of a monitor or directly from the processor after the formatting of the normalized measurement data. It is further noted that FIGS. 3A–3C are only intended to be examples of screen shots and, of course, many variations are possible. Therefore, the present invention is not limited to any specific screen shot.

Figure 4:
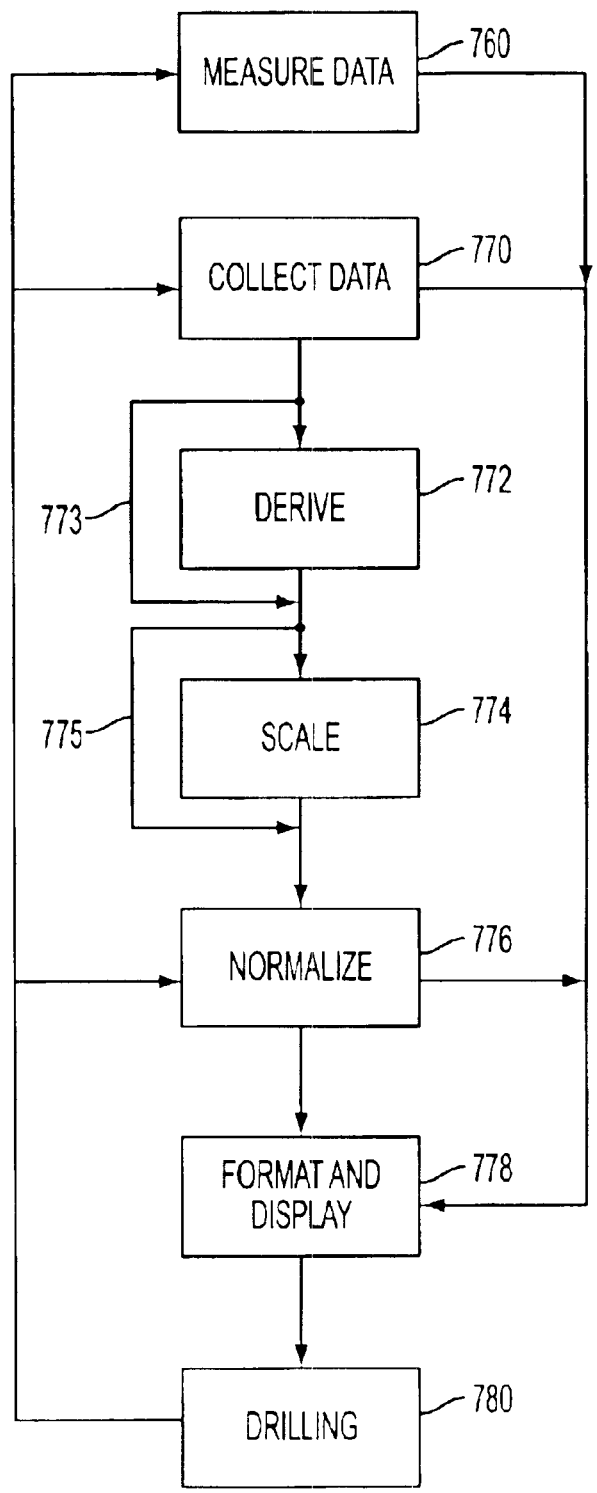
FIG. 4 is a flow diagram illustrating the flow of heterogeneous scalar measurement data through the system, according to embodiments of the present invention.

FIG. 4 is a flow diagram illustrating the flow of heterogeneous scalar measurement data through the system, according to embodiments of the present invention. Referring now to FIG. 4, in operation 760, network devices operate to generate scalar measurement data and in operation 770, heterogeneous scalar measurement data is collected. If the collected heterogeneous scalar measurement data needs to be intervalized, that is done during collection. In an embodiment, the collected heterogeneous scalar measurement data is automatically derived in operation 772. In another embodiment, nothing is derived from the collected heterogeneous scalar measurement data, and operation 772 is bypassed via branch 773. In an embodiment, the collected heterogeneous scalar measurement data, bypassing operation 772 via branch 773, is automatically scaled in operation 774. In another embodiment, the derived measurement is automatically scaled in operation 774. In a further embodiment, nothing is scaled, and operation 774 is bypassed via branch 775. The process moves to operation 776, where the collected heterogeneous scalar measurement data, the scaled derived measurement, the scaled collected heterogeneous scalar measurement data, or the derived measurement is normalized (FIG. 4 defines operation 776 in greater detail). From operation 776, the process moves to operation 778, where the normalized measurement data is displayed by the display system 712. As the displaying of normalized measurement data is typically a continuous operation, this overall process would be repeated as more and more scalar measurement data is collected. In addition, after operation 778, where the normalized measurement data is formatted and displayed, the process may return to operation 776 to collect the next normalized measurement data. It is also noted that the display system may be programmed to display a graphical representation of normalized measurement data for only particular time period, for example, and though additional normalized measurement data may be collected, the older normalized data will still be displayed until the next particular time period occurs.

Based on the displayed graphical representations of the normalized measurement data, operation 780 can be performed to implement a drilling into the underlying information of the displayed information for more detailed information for any or all of the displayed graphical representations. For example, in FIG. 3A, if a user initiated operation 780, of FIG. 4, then the displayed data for the lower right congestion events illustration could be drilled into for a more fine display of the data, e.g., displaying the normalized measurement data in second intervals, or to illustrate the exact normalized values. In this example, where more detailed normalized values are desired, or the actual raw normalized values are required, operation 780 could entail initiating operation 778 to display that more detailed information, in whatever format desired, i.e., additional graphical representations, tabular, or a raw listing, for example. Similarly, regarding the radar charts of FIG. 3C, for example, drilling down to underlying information can easily be accomplished by merely using a pointing device to click on or activate one of the circular identifiers or the labeled network devices, or group of devices. Similar to above, the displaying of this more detailed information can also include the output of such data to a printer or file, for later review.

If an even more detailed or raw review of the scalar measurement data is required, i.e., before the normalization of the scalar measurement data, then operation 780 could entail initiating operation 760 or operation 770 and forwarding that information directly either to the processor performing the normalized measurement data formatting or another processor in the displaying operation 778, for further display of the information. In this embodiment, the actual measured or collected data could be displayed, in any desired format, e.g., graphical or tabular. Further, although not illustrated, drilling operation 780 could also include displaying measurement data generated at each of the deriving operation 772, the scaling operation 774, or the normalization operation 776.

In an additional embodiment, operation 780 could further entail initiating the starting of a user interface for network devices which might also be agents, noting again agents include both the ability to communicate with other devices and can include a capability to launch applications or programs, which in this case would at least be the user interface. Thus this drilling embodiment includes calling up a network device to launch a user interface in a conventional manner, and would then allow that user interface to be displayed. In this manner, a user can drill down directly to the network device and verify that the measurement data being generated is correct, initiate diagnostic operations, or call up additional programs or applications to potentially reassign operations at the network device or to correct for any problem occurring at that point in the network corresponding to the network device. As an example, if a user determines through an initial broad graphical representation on the display, that a network is overloaded, the user could drill down to the actual network device, launch the corresponding user interface, and change parameters or operations of that particular portion of the network to relieve the overload. Further, similar to above, the user could also look at additional raw measurement data, before that measurement data had been output to the data collectors.

As noted above, it would be possible for a user viewing initial broad graphical representations of normalized measurement data to drill down to the underpinning network device collecting that measurement data. If additional network devices or networks are connected to the aforementioned network 700, the user could also initiate a communication with, and drill down to, the additional network devices or networks by cross-launching user interfaces in the same, regardless of whether the measurement data generated by those additional network devices is related to the initial reviewed normalized measurement data or even whether the measurement data generated by those additional network devices is even related to the present network 700. Once a drilling operation is initiated to either network 700 or an initial network device, and a user interface is operative, any other network or network device in communication with network 700 or the initial network device can be drilled to and any measurement data collected or stored may be reviewed. Similarly, once the drilling into the other network or network device has been achieved the information therein can be displayed, and applications and operations at the other network or network device can also be controlled.

A further embodiment of the present invention includes drilling into data or down into network devices or networks with "context." Contextual drilling of information includes collecting a context of what a user is or has been interested in or has previously done and providing the information, resulting from the drilling of information, in a format in view of that context. For example, when drilling into underlying measurement data of a graphical representation of the same for a particular time frame, the result of the drilling into the underlying measurement data will also be for that particular time frame. Similarly, if the present drilling of information is a resultant of previous drilling down through measurement data, with each drill down narrowing the scope with more detail, of what a user is interested in viewing, the present drilling of more information would include that previously narrowed scope and would seamlessly display to the user the drilled down to information with the narrowed scope. In this manner, a user does not have to go through multiple steps each and every time they drill down to underlying information. The drilled into information can be displayed without information that is not needed or desired by the user. Similarly, in addition to the drilling unit collecting and utilizing the collected context information, the same context information can be provided to drilled into network devices or networks, e.g., the context information could be provided to a network device's user interface for a operation at that network device.

This contextual drilling into information thus includes a filtering feature of allowing drilled into information to be displayed without unnecessary drilled into information or the use of such unnecessary information. Typically the drilled into information includes a large quantity of information that is not germane to the particular troubleshooting or monitoring being performed.

Embodiments of the present invention are not limited to a graph on X and Y axes using vertical display elements, nor is the present invention limited to only the types or formatting illustrated in the screen shots of FIGS. 3A-3C, e.g., a color spreadsheet or scatter plot may be used, or the formatting could include formatting information for display in three dimensions. Further, embodiments of the present invention are not limited to displaying only one type and set of measurements at a time. For example, multiple graphs may be displayed on the same screen, each graph representing a different type and set of measurements, thresholds, etc. A particular "type" of measurement data can be defined as measurement data from a particular network device of from multiple network devices and designated for illustration in a single graphical representation.

The network, network devices, data collectors, threshold event organizer, display system, and subscribers included in the system may include, for example, memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium may include read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc. In addition, as noted above, the ultimate display of the formatted normalized measurement data may be displayed in an location remote from a processor performing the formatting, and the propagation of the formatted display information being transferred to the remote location may be carried on a carrier wave. The term remote in this instance could also at least represent a wireless connection between the processor and the display, regardless of their actual physical locations. Further, the term processor is not limiting to a single processor.

As indicated above, various procedures have been indicated as potentially being performed "automatically," which indicates that the operation is performed in an automated manner by a computer, and intervention by the network administrator is not required.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for drilling into displayed heterogeneous measurement data, comprising:
   transforming collected heterogeneous scalar measurement data from heterogeneous network devices by using a mathematical transform to transform a heterogeneous scalar measurement data, from at least one of the network devices, into a homogeneous mathematical transform space so that the heterogeneous scalar measurement data is normalized;
   displaying the transformed heterogeneous scalar measurement data; and
   drilling into the displayed transformed heterogeneous scalar measurement data to display additional measurement data from which the displayed transformed heterogeneous scalar measurement data is based.

2. The method of claim 1, wherein the collected heterogeneous scalar measurement data is intervalizing.

3. The method of claim 1, wherein the transforming further comprises:
   deriving a measurement from the collected heterogeneous scalar measurement data; and
   scaling the derived measurement or the collected heterogeneous scalar measurement data.

4. The method of claim 3, wherein the transforming normalizes the collected heterogeneous scalar measurement data, the scaled derived measurement, the scaled collected heterogeneous scalar measurement data, or the derived measurement.

5. The method of claim 1, wherein at least one of the collected heterogeneous scalar measurement data is formatted according to an SNMP protocol.

6. The method of claim 1, wherein the drilling further comprises displaying non-normalized heterogeneous scalar measurement data.

7. The method of claim 1, wherein the drilling further comprises drilling to a data collector and displaying scalar measurement data stored in the data collector, with the stored scaled measurement data being a basis for the collected heterogeneous scalar measurement data.

8. The method of claim 1, wherein the drilling further comprises drilling to the one network device and displaying measurement data stored in the one network device.

9. The method of claim 1, wherein the drilling further comprises:
   drilling to the one network device with context;
   launching a user interface in the one network device; and
   launching applications or operations in the one network device to control the network operation.

10. The method of claim 9, wherein the drilling further comprises drilling to another network device or another network and displaying measurement data stored in the other network device or other network.

11. The method of claim 9, wherein the drilling further comprises:
    drilling to another network device or another network with context;
    cross-launching a user interface in the other network device or other network; and
    launching applications or operations in the other network device or other network to control the other network operation.

12. The method of claim 1, wherein the drilling includes drilling into the displayed transformed heterogeneous scalar measurement data with context.

13. An apparatus to drill into displayed heterogeneous scalar measurement data, comprising:
    a transforming unit to transform collected heterogeneous scalar measurement data from heterogeneous network devices by using a mathematical transform to transform a heterogeneous scalar measurement data, from at least one of the network devices, into a homogeneous mathematical transform space so that the heterogeneous scalar measurement data is normalized;
    a displaying unit to display the transformed heterogeneous scalar measurement data; and
    a drilling unit to drill into the displayed transformed heterogeneous scalar measurement data for display, by the display unit, of additional measurement data from which the displayed transformed heterogeneous scalar measurement data is based.

14. The apparatus of claim 13, wherein at least one of the collected heterogeneous scalar measurement data is formatted according to an SNMP protocol.

15. The apparatus of claim 13, further comprising displaying drilled non-normalized heterogeneous scalar measurement data.

16. The apparatus of claim 13, wherein the drilling unit drills to a data collector for display of scalar measurement data stored in the data collector, with the stored scaled measurement data being a basis for the collected heterogeneous scalar measurement data.

17. The apparatus of claim 13, wherein the drilling unit drills to the one network device for display of measurement data stored in the one network device.

18. The apparatus of claim 13, wherein the drilling unit drills to the one network device and causes a launching of a user interface in the one network device and a launching of applications or operations to control the network operation.

19. The apparatus of claim 18, wherein the drilling unit drills to another network device or another network, with context, to display measurement data stored in the other network device or other network.

20. The apparatus of claim 18, wherein the drilling unit drills to another network device or another network, with context, and causes a cross-launching of a user interface in the other network device or other network and a launching of applications or operations to control the other network operation.

21. A medium that provides instructions for displaying heterogeneous scalar measurement data, which, when executed by a machine, cause the machine to perform operations comprising:

transforming collected heterogeneous scalar measurement data from heterogeneous network devices by using a mathematical transform to transform a heterogeneous scalar measurement data, from one of the network devices, into a homogeneous mathematical transform space so that the heterogeneous scalar measurement data is normalized;

displaying the transformed heterogeneous scalar measurement data; and drilling into the displayed transformed heterogeneous scalar measurement data to display additional measurement data from which the displayed transformed heterogeneous scalar measurement data is based.

22. The medium of claim 21, wherein the instructions further cause the machine to perform operations comprising:

deriving a measurement from the collected heterogeneous scalar measurement data; and scaling the derived measurement or the collected heterogeneous scalar measurement data.

23. The medium of claim 21, wherein the drilling further comprises drilling to a data collector and displaying scalar measurement data stored in the data collector, with the stored scaled measurement data being a basis for the collected heterogeneous scalar measurement data.

24. The medium of claim 21, wherein the drilling further comprises drilling to the one network device and displaying measurement data stored in the one network device.

25. The medium of claim 21, wherein the drilling further comprises:

drilling to the one network device with context;

launching a user interface in the one network device; and launching applications or operations to control the network operation.

* * * * *